(12) United States Patent
Kim et al.

(10) Patent No.: US 12,540,998 B2
(45) Date of Patent: Feb. 3, 2026

(54) METHOD AND APPARATUS FOR OPERATING SERVER IN RELATION TO PRE-ASSESSMENT OF RISK

(71) Applicant: LG ELECTRONICS INC., Seoul (KR)

(72) Inventors: Hyeyoung Kim, Seoul (KR); Bokyoung Sung, Seoul (KR); Hakseong Kim, Seoul (KR); Min Song, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 306 days.

(21) Appl. No.: 18/203,322

(22) Filed: May 30, 2023

(65) Prior Publication Data
US 2024/0402280 A1  Dec. 5, 2024

(51) Int. Cl.
*G01S 5/00* (2006.01)
*H04W 4/02* (2018.01)
*H04W 4/40* (2018.01)

(52) U.S. Cl.
CPC ........... *G01S 5/0072* (2013.01); *H04W 4/025* (2013.01); *H04W 4/40* (2018.02)

(58) Field of Classification Search
CPC ..... G01S 5/0072; G06Q 50/40; H04W 4/025; H04W 4/40
See application file for complete search history.

(56) References Cited

U.S. PATENT DOCUMENTS

| | | | |
|---|---|---|---|
| 2018/0208195 A1* | 7/2018 | Hutcheson | B60W 50/14 |
| 2021/0158687 A1 | 5/2021 | Beauchamp et al. | |
| 2021/0263166 A1* | 8/2021 | Zheng | G08G 1/0116 |
| 2021/0383686 A1* | 12/2021 | Xu | G08G 1/04 |
| 2024/0109541 A1* | 4/2024 | Ucar | G08G 1/0112 |
| 2024/0185717 A1* | 6/2024 | Wendt | B62J 11/04 |
| 2024/0416756 A1* | 12/2024 | Wendt | B60L 50/20 |

FOREIGN PATENT DOCUMENTS

| | | |
|---|---|---|
| KR | 10-2021-0011258 A | 2/2021 |
| KR | 10-2022-0131275 A | 9/2022 |
| WO | WO 2021/182935 A1 | 9/2021 |
| WO | WO 2022/154575 A1 | 7/2022 |

\* cited by examiner

*Primary Examiner* — Lester G Kincaid
(74) *Attorney, Agent, or Firm* — Birch, Stewart, Kolasch & Birch, LLP

(57) ABSTRACT

A Soft Vehicle to Everything (V2X) server in a wireless communication system, and including a receiver configured to receive messages from a plurality of user equipments (UEs); a controller configured to determine an assessment risk between a pair of UEs included in the plurality of UEs based on the received messages, and determine at least one primary candidate UE among the pair of UEs to be included in a risk candidate list based on the determined assessment risk between the pair of UEs; and a transmitter configured to transmit the risk candidate list to the plurality of UEs.

16 Claims, 19 Drawing Sheets

: First subscription area

: Second subscription area

FIG. 13

| Bit | 7 | 6 | 5 | 4 | 3 | 2 | 1 | 0 |
|---|---|---|---|---|---|---|---|---|
| Variable Header | MQTT Control Packet Type (Publish = 3) | | | | DUP | QOS | | RETAIN |
| | Remaining Length | | | | | | | |
| Variable Header | Topic Name (UTF-8 Encoded, UNC/v2x_id) | | | | | | | |
| | Packet Id | | | | | | | |
| | Property Length | | | | | | | |
| Payload | Risk Candidate List Information | | | | | | | |

| Bit | 7 | 6 | 5 | 4 | 3 | 2 | 1 | 0 |
|---|---|---|---|---|---|---|---|---|
| Fixed Header | MQTT Control Packet Type (Soft V2X Specific Control Packet Type=0) | | | | Reserved | | | |
| | Remaining Length | | | | | | | |
| Variable Header | Soft V2X Specific Command (Subscribe List = 2) | | | | | | | |
| | Properties (Property Length = 0) | | | | | | | |
| Payload | Risk Candidate List Information | | | | | | | |

(a)

(b)

METHOD AND APPARATUS FOR OPERATING SERVER IN RELATION TO PRE-ASSESSMENT OF RISK

BACKGROUND

Technical Field

The present disclosure relates to a wireless communication system and more particularly to a method and apparatus for operating a server and a user equipment in relation to pre-assessment of risk in vehicle-to-everything (V2X) or Soft V2X.

Discussion of the Related Art

Wireless communication systems provide various types of communication services such as voice and data. In general, a wireless communication system is a multiple access system capable of supporting communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

Sidelink (SL) refers to a communication scheme in which a direct link is established between user equipments (UEs) and the UEs directly exchange voice or data without intervention of a base station (BS). SL is considered as a solution of relieving the BS of the constraint of rapidly growing data traffic.

Vehicle-to-everything (V2X) is a communication technology in which a vehicle exchanges information with another vehicle, a pedestrian, and infrastructure by wired/wireless communication. V2X can be categorized into four types: vehicle-to-vehicle (V2V), vehicle-to-infrastructure (V2I), vehicle-to-network (V2N), and vehicle-to-pedestrian (V2P). V2X communication can be provided via a PC5 interface and/or a Uu interface.

As more communication devices demand larger communication capacities, there is a need for enhanced mobile broadband communication relative to existing Radio Access Technologies (RATs). Accordingly, a communication system is under discussion, for which services or UEs sensitive to reliability and latency are considered. The next-generation RAT in which eMBB, MTC, and URLLC are considered is referred to as new RAT or NR. In NR, V2X communication is also supported.

SUMMARY

Accordingly, the present disclosure is directed to a method and apparatus for operating a server in relation to pre-assessment of risk that substantially obviate one or more problems due to limitations and disadvantages of the related art.

One object of the present disclosure is to provide a method and apparatus for a server to pre-assess whether there is risk of collision between user equipments (UEs) in Soft Vehicle to Everything (V2X).

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the disclosure, as embodied and broadly described herein, there is provided a server related to Soft V2X in a wireless communication system. The server cancan include a receiver configured to receive messages from a plurality of UEs; a controller configured to determine a risk candidate list based on the messages received from the plurality of UEs; and a transmitter configured to transmit the risk candidate list. Final candidate UEs included in the risk candidate list can be determined by pre-assessment of risk between pairs of UEs including the plurality of UEs.

In another aspect of the present disclosure, there is provided a method of operating a server related to Soft V2X in a wireless communication system. The method can include receiving messages from a plurality of UEs; determining a risk candidate list based on the messages received from the plurality of UEs; and transmitting the risk candidate list. Final candidate UEs included in the risk candidate list can be determined by pre-assessment of risk between pairs of UEs including the plurality of UEs.

In another aspect of the present disclosure, there is provided a UE related to Soft V2X in a wireless communication system. The UE can include a transmitter configured to transmit a message to a server; and a receiver configured to receive a risk candidate list from the server. The risk candidate list can be determined by the server based on messages received from a plurality of UEs including the UE, and final candidate UEs included in the risk candidate list can be determined by pre-assessment of risk between pairs of UEs including the plurality of UEs.

In a further aspect of the present disclosure, there is provided a method of operating a UE related to Soft V2X in a wireless communication system. The method can include transmitting a message to a server; and receiving a risk candidate list from the server. The risk candidate list can be determined by the server based on messages received from a plurality of UEs including the UE, and final candidate UEs included in the risk candidate list can be determined by pre-assessment of risk between pairs of UEs including the plurality of UEs.

Risk of each of the plurality of UEs can be assessed only for the final candidate UEs included in the risk candidate list. Each pair of UEs can be composed of a host UE that transmits a message to the server and a remote UE paired with the host UE. The pre-assessment of risk can be performed based on at least one of: whether the host and remote UEs in each pair of UEs have a same operation mode or operational type, headings of the host and remote UEs, or relative positions of the host and remote UEs.

The operation mode or operational type can refer to any one of a pedestrian, a vehicle, and a personal mobility vehicle (PMV). Here, the vehicle can be a potential perpetrator for the PMV, the PMV can be a potential perpetrator for the pedestrian, and the pedestrian can be a potential victim for both the vehicle and the PMV. When the host and remote UEs in each pair of UEs have the same mode, each of the host and remote UEs having the same mode can be determined as a primary candidate UE.

When the host and remote UEs in each pair of UEs have different modes and when the remote UE is a potential perpetrator, the remote UE can be determined as a primary candidate UE. When the host and remote UEs in each pair of UEs have different modes and when the host UE is a potential perpetrator, the remote UE corresponding to a potential victim can be determined as a primary candidate UE only in cases where there is risk of collision.

When there is risk of collision can include: a case in which the potential victim is in front of the potential perpetrator and the potential victim and the potential perpetrator are traveling in a same direction; and a case in which the potential victim is behind the potential perpetrator and the potential victim and the potential perpetrator are traveling in a direction approaching each other. The final candidate UEs can be determined by further considering at least one of information on relative positions, distances, or speeds of the primary candidate UEs.

When a UE receiving the risk candidate list is a potential perpetrator, only a remote UE with risk of collision can be displayed on a Soft V2X application screen. When a UE receiving the risk candidate list is a potential victim, a remote UE corresponding to a potential perpetrator can be displayed on a Soft V2X application screen. The receiver can be a message (Msg) receiver (RX) module, the transmitter can be a message (Msg) transmitter (TX) module, and the controller can be a pre-assessment manager module.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIGS. 6 to 14 are diagrams for explaining embodiment(s); and

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

In various embodiments of the present disclosure, "/" and "," should be interpreted as "and/or." For example, "A/B" can mean "A and/or B." Further, "A, B" can mean "A and/or B." Further, "A/B/C" can mean "at least one of A, B and/or C." Further, "A, B, C" can mean "at least one of A, B and/or C." In various embodiments of the present disclosure, "or" should be interpreted as "and/or." For example, "A or B" can include "only A," "only B," and/or "both A and B." In other words, "or" should be interpreted as "additionally or alternatively."

Figure 1:
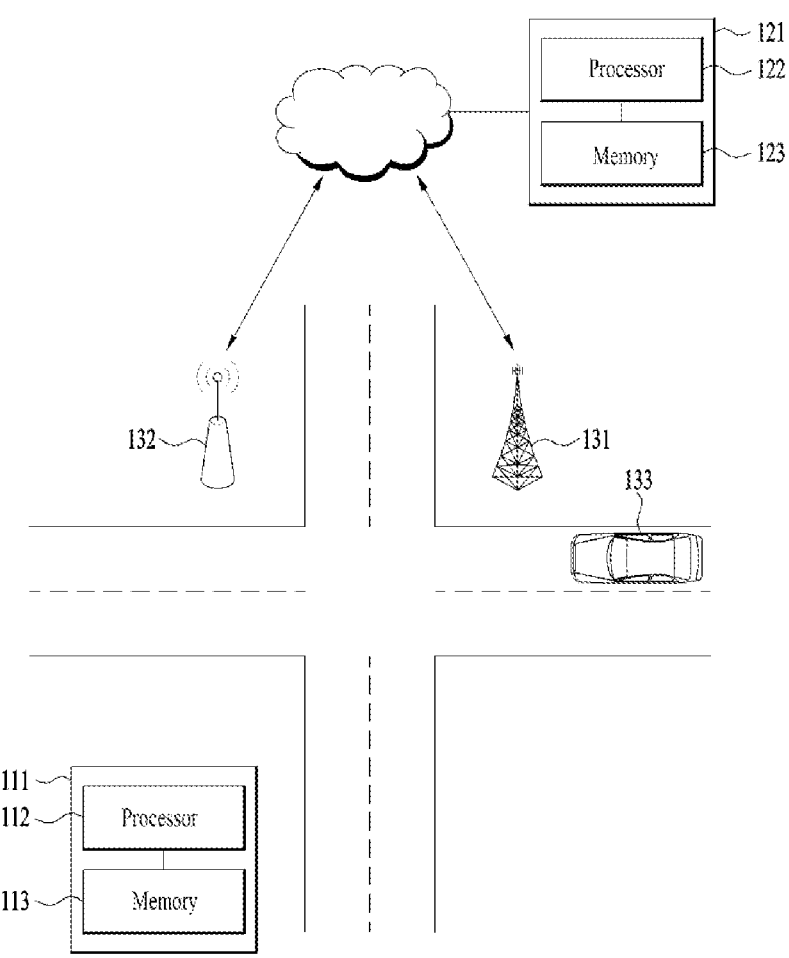
FIG. 1 is a diagram illustrating a system to which the present disclosure is applied.

FIG. 1 is a diagram showing a system having the present disclosure applied thereto. The system includes a UE 111 (or a V2X equipment/device) and a server 121 (or a V2X server). The UE 111 can communicate with the server 121 through a base station 131 or a Road Side Unit (RSU) 132. The UE 111 can communicate with the base station 131, the Road Side Unit (RSU) 132, a neighbor vehicle 133, and/or a neighbor UE using a wireless communication protocol. There is no limit to wireless communication protocols, including, for example, Dedicated Short Range Communications (DSRC), Cellular-V2X (C-V2X), WiFi, Bluetooth, and/or $3^{rd}$ Generation Partnership Project (3GPP) based Cellular Communication Protocol (e.g., Wideband Code Division Multiple Access (WCDMA), Long Term Evolution (LTE), New Radio (NR), etc.).

The server 121 receives one or more V2X messages from the UE 111 in a managed area. The server 121 can forward the one or more collected V2X messages to a UE 111 currently subscribing.

The V2X message is periodically or aperiodically transmitted by the UE 111 (or RSU 132) to the server 121 and provides state information of the UE 111 (or a device managed by the RSU 132). For example, the UE 111 can transmit 10 V2X messages per second. The server 121 collects V2X messages from a multitude of UEs and forwards the V2X messages to the subscribing UE.

The following table shows an example of information elements included in the V2X message. Not all information elements are essential, and the name is just an example. Information elements can be added/changed/deleted depending on the policy or situation.

TABLE 1

| Name | Description |
|---|---|
| V2X ID | Temporary Identifier (ID) for identifying UE that transmits this message. This can be randomly selected by UE and periodically changed. The size can be 4 octets. |
| Position | Indicates the location of UE. This can include Latitude, Longitude, and Elevation. |
| (Positional Accuracy | Includes quality of various parameters used to model the accuracy of positioning. |
| Velocity | Indicates the speed of UE. |
| Heading | Indicates the current heading (direction of motion) of UE. |
| Path History | Defines a geometric path reflecting UE's movement over some period of time and/or distance |

TABLE 1-continued

| Name | Description |
| --- | --- |
| Acceleration | Indicates acceleration of UE. This can include a set of acceleration values for three orthogonal directions of UE: longitude axis, lateral axis, and vertical axis. |
| Device type | Indicates the type of UE. Examples: Pedestrians, vehicles, bicycles, etc. |
| Publishing area | Area where the UE sends V2X messages to the server. Publishing area includes one or more tiles at each level. |

A V2X message transmitted by the UE 111 to the server 121 is referred to as an Uplink (UL) V2X message, and a V2X message transmitted by the server 121 to the UE 111 is referred to as a Downlink (DL) V2X message. The UE 111 can include a processor 112 and a memory 113. The processor 112 implements the function of the UE 111 and can include one or more software modules. The UE 111 can further include various additional devices according to functions such as a display, a user interface, a wireless modem, etc.

The server 121 includes computing hardware connected to the one or more base stations 131 and/or the RSU 132 to provide V2X functions and services to UE 111. The server 121 can be a Mobile/multi-access Edge Computing (MEC)-based server or a centralized server. The server 121 can be referred to as another name such as a geocast server, a soft server, etc. The server 121 can include a processor 122 and a memory 123. The processor 122 implements a function of the server 121 and can include one or more software modules.

The processor 112/122 can include Application-Specific Integrated Circuit (ASIC), Central Processing Unit (CPU), Application Processor (AP), Digital Signal Processors (DSPs), Digital Signal Processing Devices (DSPDs), Programmable Logic Devices (PLDs), Field Programmable Gate Arrays (FPGAs), microcontroller, chipset, logic circuit, data processor, and/or combinations thereof. In a software implementation for the following embodiments, software codes for performing the functions described herein can be stored in the memory 113/123 and processed by the processor 112/122.

The memory 113/123 can store information accessible by the processor 112/122. The information can include instructions executable by the processor 112/122 and/or data processed by the processor. The memory 113/123 can include any form of computer-readable medium configured to store information. For example, the memory 113/123 can include Read Only Memory (ROM), Random Access Memory (RAM), Digital Video Disc (DVD), optical disc, flash memory, Solid State Drive (SSD), hard drive, and combinations thereof.

Message Queuing Telemetry Transport (MQTT) is used as a message protocol between the UE 111 and the server 121, but this is only an example. Advanced Message Queuing Protocol (AMQP), Hypertext Transfer Protocol (HTTP), and/or vendor specific protocols can be used.

Now, the setting of an area for a V2X service will be described in more detail. Hereinafter, a tile refers to a geographical basic unit for setting a subscription area. Hereinafter, a quadrangle is shown as a tile shape, which is just exemplary. There are no restrictions on the shapes of tiles such as polygons, circles, etc.

Figure 2:
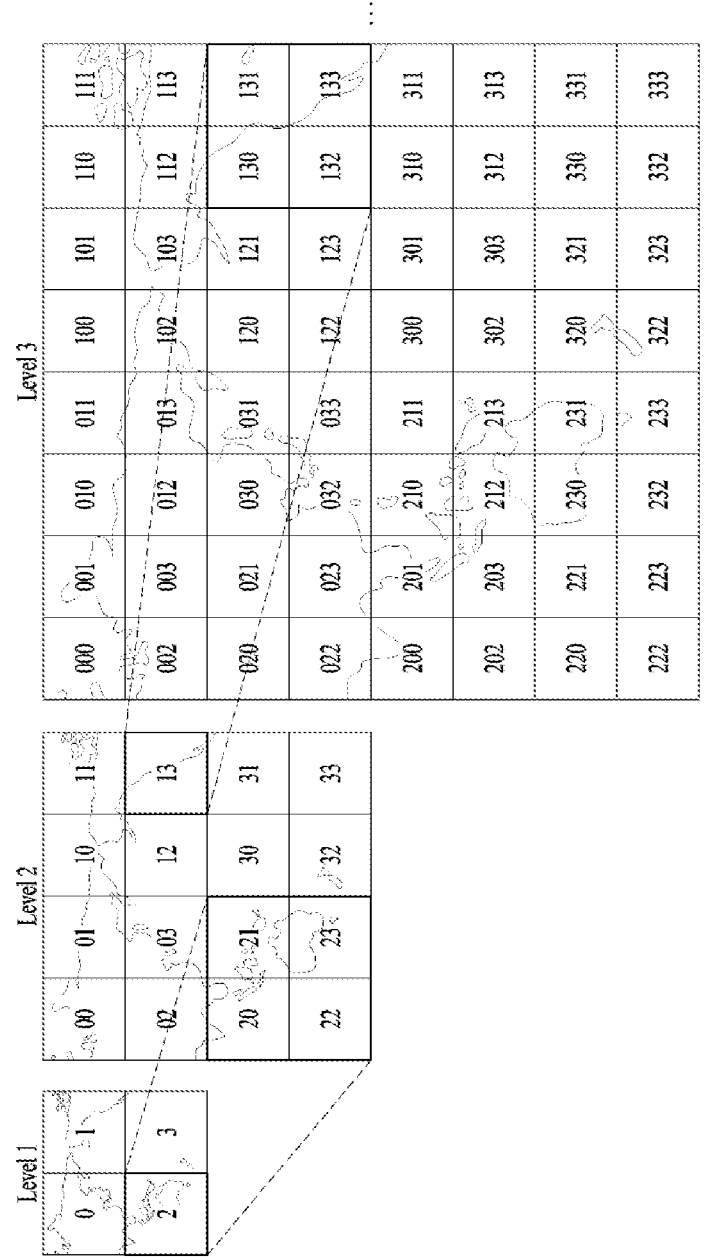
FIG. 2 is a diagram illustrating an example of a tile based on a quadtree.

FIG. 2 is a diagram showing an example of a quadtree used tile. The quadtree represents a partition of space in two dimensions by decomposing a map (i.e. world map) into four equal quadrants, subquadrants, and so on. A size of the quadrant varies according to a zoom level, and each quadrant corresponds to a tile. Here, the cases where the levels are 1, 2, and 3 are shown. The larger the level, the smaller the size of the tile. At each level, a unique identifier is assigned to a tile. A tile ID can have the bit number corresponding to a level.

A UE can obtain an ID of a tile in which the UE is located based on its location information (e.g., latitude and longitude). The UE and/or server can adjust a size of an area by adjusting a level according to a situation.

In the following embodiment, areas for a V2X service are as follows.

Management area: An area managed by a server when one or more servers distributively manage an area to serve large-scale users or a large area. The management area includes one or more tiles.

Subscription area: An area where a UE has subscribed to a server. The subscription area can be referred to by other names such as a concerned area, an impact area, a geocast area, etc. The subscription area includes one or more tiles. The subscription area can be included in one management area, or can be defined over a plurality of management areas by a plurality of servers.

Publishing area: An area where a UE transmits a V2X message to a server. The publishing area can include one or more tiles at each level. The publishing area can indicate a tile in which the UE is currently located. A part or all of the publishing area can overlap the subscription area.

Figure 3:
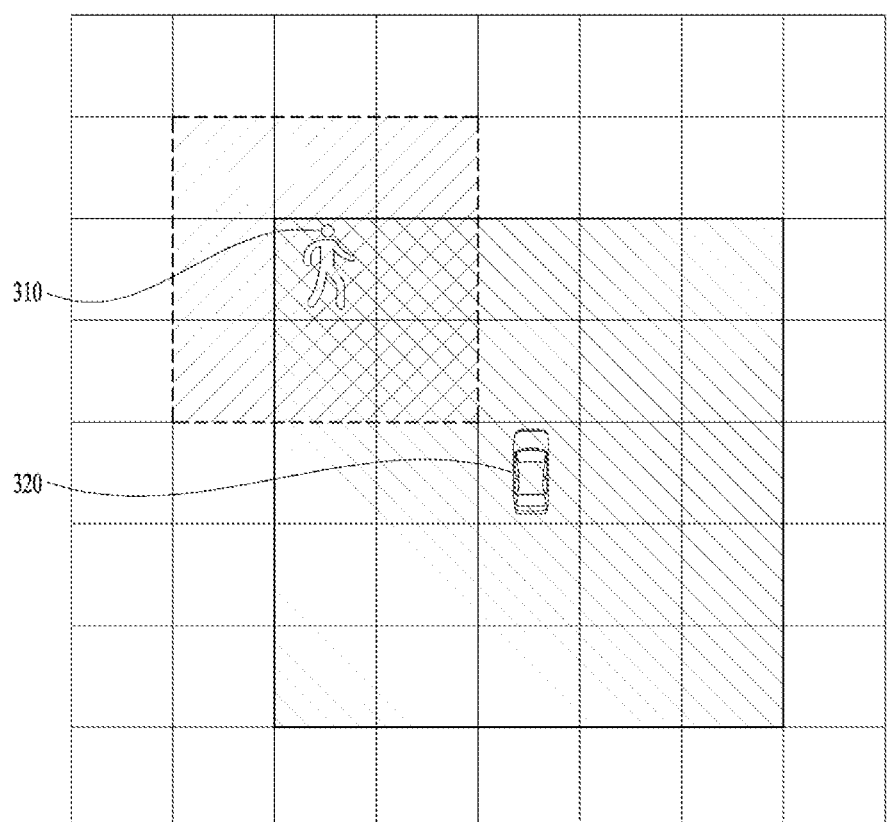
FIG. 3 is a diagram illustrating an example of configuring a subscription area.
Figure 3:
Figure 3:

Next, FIG. 3 shows one example of setting a subscription area. A first subscription area is set for a first UE 310, and a second subscription area is set for a second UE 320. Each of the UEs can periodically or aperiodically set/change/delete the subscription area (e.g., when its location is changed). Each of the UEs can request the server to set/change/delete the subscription area.

The number of tiles included in the first subscription area is 9, and the number of tiles included in the second subscription area is 25, but there is no limit to the number of tiles included in the subscription area or the shape of the subscription area. The subscription area can include a tile in which the UE is located. Alternatively, the subscription area can include one or more tiles except for the tiles in which the UE is located.

The first UE 310 can generate a first V2X message and periodically transmit the first V2X message to a server. The second UE 450 can generate a second V2X message and periodically transmit the second V2X message to the server. The server can forward one or more V2X messages received in or around the subscription area to a UE associated with the subscription area.

A device for setting a subscription area can be referred to as a 'subscriber device.' Also, a device for transmitting a V2X message to a server can be referred to as a 'publisher device.' A UE can be a subscriber device, a provider device, or both a subscriber device and a provider device. The server can forward V2X messages transmitted by provider devices in a management area to the subscriber device.

The server can deliver a V2X message of the provider device 'associated' with a subscription area of the subscriber device to the subscriber device. The provider device associated with the subscription area of the subscriber device can be referred to as a 'subscribed provider device.' The provider device associated with the subscription area of the subscriber device can satisfy at least one of the following conditions (i) to (iii). (i) Some or all of the publishing area of the provider device overlaps the subscription area of the subscriber device. (ii) Some or all of the subscription area of the provider device overlap the subscription area of the subscriber device. (iii) A location where the provider device transmits the V2X message is within the subscription area of the subscriber device.

According to the condition (i) or (iii), the server delivers a V2X message received within the first subscription area to the first UE 310. The server delivers a V2X message received in the second subscription area to the second UE 320.

Since the first UE 310 is located in the second subscription area, the server can forward the first V2X message to the second UE 320. The second UE 320 is a subscriber device, and the first UE 310 becomes a subscribed provider device.

Since the second UE 320 is not located in the first subscription area (which means that the condition (i) or the condition (iii) is not satisfied), the server does not forward the second V2X message to the first UE 310. The second UE 320 is not a provider device of the first UE 310. If the condition (ii) is considered, the second UE 320 can be a provider device of the first UE 310.

Figure 4:
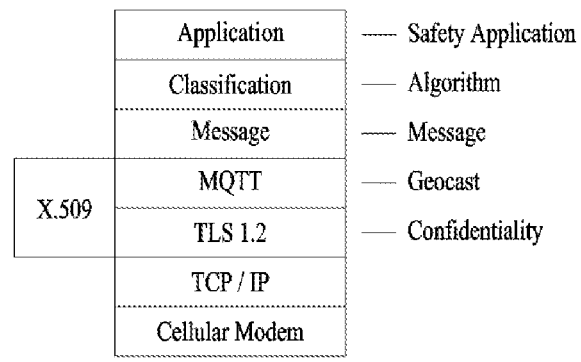
FIG. 4 is a diagram illustrating a Soft Vehicle to Everything (V2X) protocol stack.

Next, FIG. 4 is a diagram showing a Soft V2X protocol stack operable in a UE, a smartphone, etc. Each layer of the Soft V2X protocol stack will be described with reference to FIG. 4. Here, Soft V2X is one V2X communication method in which a method described below is used, and the following description is not limited to the term Soft V2X. In addition, other terms referring to a communication method corresponding to the following description can also be considered as corresponding to Soft V2X in the present disclosure.

Cellular Modem is a modem that uses cellular networks. A cellular network is a communication network configured and operated by dividing an area into several cells, where a cell means a divided area including a single base station. Cellular network communication technology can include 5G New RAT (NR), Long Term Evolution (LTE), and the like. In Soft V2X, unicast communication is performed unlike in the case of V2X. In Soft V2X protocol, a network/transport layer uses IP/TCP used for cellular networks.

Transport Layer Security (TLS) layer is intended to ensure confidentiality using transport layer security, and an authentication certificate uses X.509, a Public Key-based (PKI) ITU-T standard. In addition, Soft V2X protocol is configured to perform the geocast function of sending messages only to users in a specific area. To this end, MQTT, which is an issue-subscription-based messaging protocol, is used.

Subsequently, Soft V2X uses the message defined in SAE J2735 (BSM, PSM, RSA, etc.). SAE J2735 defines signal specifications such as messages, data frames, element formats, structures and the like for V2V/V2I communication, and the main messages are shown in Table 2 below.

TABLE 2

| Main Messages | Use range | Contents |
| --- | --- | --- |
| BSM (Basic Safety Message) | V2V | Provides overall safety-related information. Broadcasting communications with periodicity of 100 ms |
| PVD (Probe Vehicle Data) | V2I | Delivers Probe data' collected on a vehicle to RSU |
| MapData | I2V | Provides information on intersections and road topographic data |
| SPaT (SinglePhaseAndTiming) | I2V | Used in conjunction with MapData to provide information on signal phase and time synchronization of movement at the intersection |
| RTCMCorrections (Real-Time Differential Correction Maritime) | I2V | Message to provide RTCM correction information |
| PSM (PersonalSafetyMessage) | V2P | Provides information about pedestrians in danger range |
| PDM (ProveDataManagement) | I2V | Message for managing PVD messages |
| RSA (RoadSideAlert) | V2X | Supports generation of ad-hoc message from public safety vehicle and RSU |
| SSM (SignalStatusMessage) | I2V | Used for response to Facility Operational Status Request |
| SRM (SignalRequestMessage) | V2I | Message for vehicle entering intersection to obtain service information from signal controller. |
| TIM (TravelerInformationMessage) | I2V | Message that convey information on various traffic information, unexpected situations, pre-road work, etc. |
| CSR (CommonSafetyRequest) | V2V | Request message for data support for safety information exchange |
| EVA (EmergencyVehicleAlert) | V2X | Deliver information about emergency vehicle |
| ICA (IntersectionVehicleAlert) | V2X | Deliver information about vehicle hazard conditions near intersections |

TABLE 2-continued

| Main Messages | Use range | Contents |
| --- | --- | --- |
| NMEACorrections | I2V | Used for transmitting message of initial GPS data format on DSRC channel |
| testMessages00-15 | N/A | Used in customized message format for each use region |
| Not Assigned | N/A | Assigned when adding new message content |

Subsequently, a classification layer can generate data necessary for risk assessment based on algorithms. An application layer can determine whether there is risk based on the data that uploaded by the classification layer and notify pedestrians and drivers who own smartphones of the risk.

Figure 5:
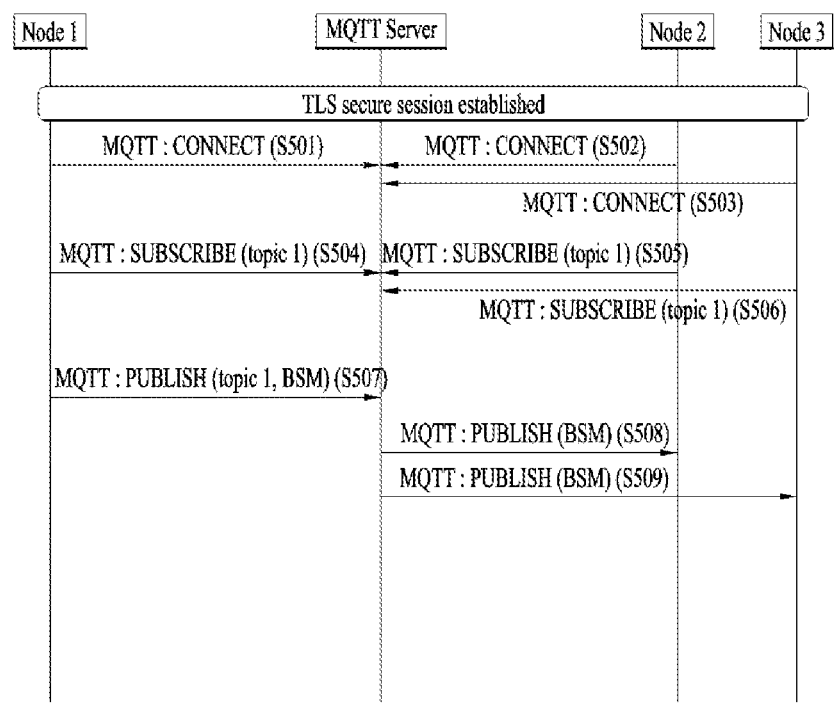
FIG. 5 is a flowchart illustrating an example of performing geocast using Message Queuing Telemetry Transport (MQTT) in Soft V2X.

FIG. 5 is a flowchart illustrating an example of geocast based on MQTT in Soft V2X. In legacy V2X with broadcast communication, devices in the same region can naturally receive messages (BSM, etc.) over broadcast channels. However, considering that the cellular network uses unicast communication, Soft V2X can perform unicast transmission to all devices in the same region based on MQTT, thereby obtaining broadcast-like effects.

For MQTT communication, a secure session needs to be first established between each node and a server based on TLS. Each node can first perform a CONNECT process and then perform a SUBSCRIBE process on a specific topic (S501 to S503 of FIG. 5). In this instance, different topics can be selected depending on regions. A map can be divided into tiles, and the same topic value can be given to each tile. Therefore, each node can perform the SUBSCRIBE process by selecting a topic according to the tile in which the corresponding node is located. For example, in FIG. 5, Nodes 1, 2, and 3 are all present in the same tile (region) and subscribe to the same topic 1 (S504 to S506 in FIG. 5).

When Node 1 transmits a PUBLISH (BSM) to an MQTT server (S507), the server can forward the PUBLISH (BSM) to all nodes having subscribed to topic 1 (S508 and S509). Each Node 2 and Node 3 can perform classification and threat assessment based on the received BSM. If detecting a risk, the corresponding node can inform smartphone users (e.g., pedestrian and driver) of the risk. A vehicle transmits a BSM, and a pedestrian transmits a PSM. These messages can contain information (e.g., ID, location, speed, acceleration, direction, etc.) necessary for risk detection.

In Soft V2X systems, a server can use the LTE Uu interface to receive a message transmitted from a Soft V2X UE of a vehicle or pedestrian and then forward the message to a Soft V2X UE of a nearby vehicle or pedestrian based on location information as described above. The UE can determine a risk of collision based on the received message and its own information and output risk information.

In the related art, the risk is detected by receiving predefined messages from adjacent Soft V2X UEs, even though the adjacent UEs may not be always at a high risk of collision. For example, if there is a pedestrian walking behind a vehicle in the same direction as the vehicle, the risk of collision between the vehicle and pedestrian is low. It is also helpful to predict the risk of collision with a vehicle for the safety of a pedestrian, but the vehicle does not need to continuously calculate the risk of collision.

If the number of UEs increases from N to (N+1) in an area that is a standard for message exchange, radio resources for all of the (N+1) UEs to exchange additional messages are further used. In addition, all UEs in the corresponding area need to use additional computing resources to analyze messages from the added UE and assess the risk of collision risk therewith.

Hereinafter, the present disclosure provides a method of reducing the frequency at which a UE with a low collision risk exchanges messages and the frequency at which the UE assesses risk of collision. In more detail, a server according to an embodiment includes a receiver configured to receive messages from a plurality of UEs; a controller configured to determine a risk candidate list based on the messages received from the plurality of UEs; and a transmitter configured to transmit the risk candidate list.

In this instance, final candidate UEs included in the risk candidate list can be determined by pre-assessment of risk between pairs of UEs including the plurality of UEs. The risk of each of the plurality of UEs can be assessed only for the final candidate UEs included in the risk candidate list. According to this method, the server can transmit a control message including a list of neighboring UEs with high collision risk to each UE, so that each UE does not process messages from unnecessary neighboring UEs or can process the messages in a longer cycle. In other words, according to this method, each UE does not evaluate all messages received from neighboring UEs but can process messages from UEs with a high collision risk selected by the server based on the pre-assessment of risk.

Each pair of UEs can be composed of a host UE that transmits a message to the server and a remote UE paired with the host UE. The pre-assessment of risk can be performed based on at least one of whether the host and remote UEs in each UE pair are in the same mode, the headings of the host and remote UEs, or the relative positions of the host and remote UEs. The mode refers to any one of a pedestrian, a vehicle, and a personal mobility vehicle (PMV). In this instance, the vehicle can cause injury to the PMV, the PMV can cause injury to the pedestrian, and both the vehicle and PMV can cause injury to the pedestrian.

Figure 6:
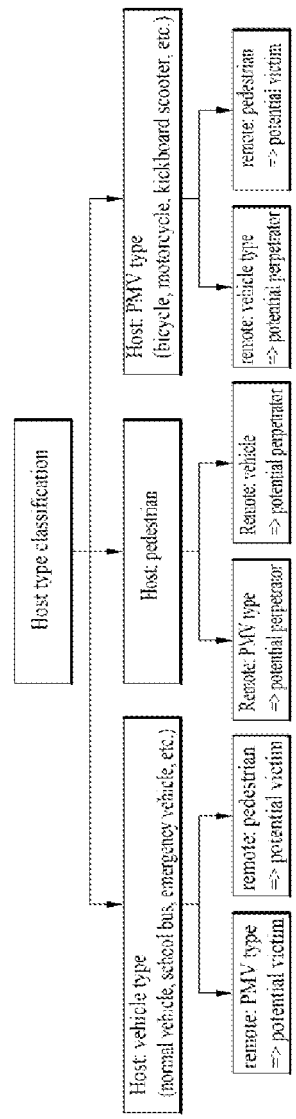

In more detail, FIG. 6 illustrates a relationship between the operation modes. Specifically, vehicles (vehicle types) can include a variety of vehicles, such as general vehicles, school buses, and emergency vehicles, and PMVs (PMV types) can include means of transportation other than vehicles such as bicycles, motorcycles, and kickboard scooters.

Based on the above, primary candidate UEs can be determined as follows. First, when the modes of the host and remote UEs in each pair of UEs are the same, each of the host and remote UEs having the same mode can be determined as the primary candidate UE. When the mode of a UE (host UE) is the same as that of a peer UE (remote UE) (e.g., vehicle to vehicle, bicycle to bicycle, etc.), the host and remote UEs can mutually cause injury to each other, and thus the host and remote UEs need to prepare for risk by receiving both a BSM and a PSM.

Second, when the modes of the host and remote UEs in each pair of UEs are different and when the remote UE is a potential perpetrator, the remote UE can be determined as the primary candidate UE so that the remote UE is displayed on a display of the host UE which is a possible victim. Thus, the remote UE will also be visible to the host UE who is a possible victim. In addition, when the modes of the host and remote UEs in each pair of UEs are different and when the host UE is a potential perpetrator, the remote UE, which is a potential victim, can be determined as the primary candidate UE only in cases where there is risk of collision. The reason for this is that when the mode of a UE (host UE) is different from that of a peer UE (remote UE) (e.g., vehicle to pedestrian, vehicle to kickboard scooter, motorcycle to pedestrian, etc.), the potential perpetrator who is not threatened may not need to receive a BSM/PSM from the potential victim depending on situations.

The cases where there is risk of collision can include where the potential victim is in front of the potential perpetrator and the potential victim and potential perpetrator are traveling in the same direction. If the potential victim is behind the potential perpetrator, and if the potential victim and potential perpetrator are traveling in the same direction, the potential perpetrator does not need to consider the risk of collision with the potential victim. That is, the potential perpetrator does not need to receive a PSM from the potential victim.

In addition, the cases where there is risk of collision can include where the potential victim is behind the potential perpetrator and the potential victim and potential perpetrator are traveling in a direction approaching each other. If the potential victim is located behind the potential perpetrator, and if the potential perpetrator is travelling toward the potential victim, the potential perpetrator needs to receive a PSM from the potential victim in consideration of the risk of collision with the potential victim.

Figure 7:
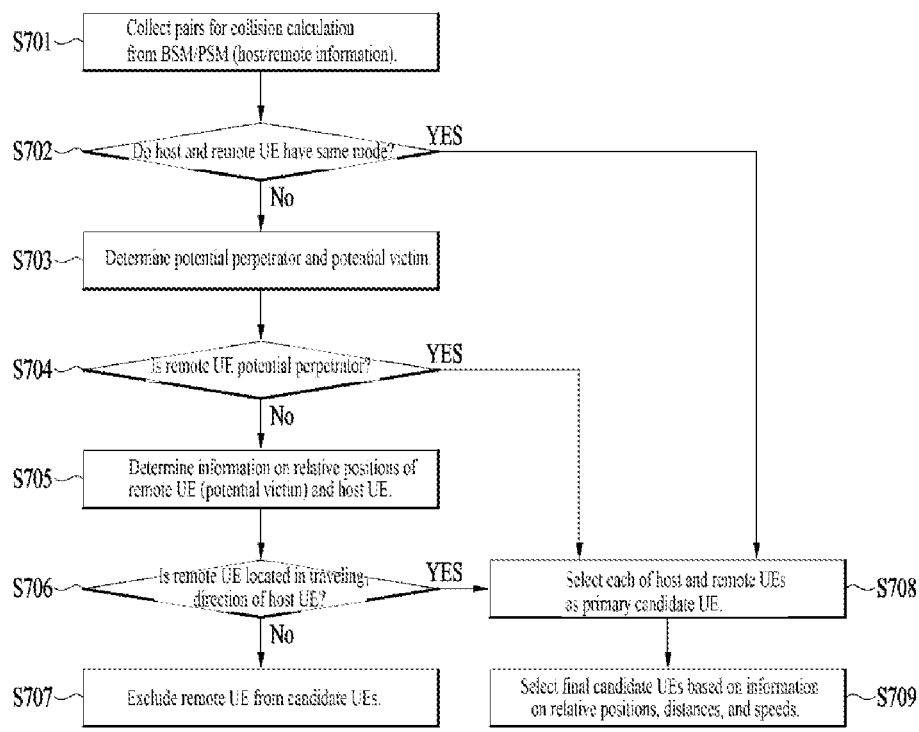

The final candidate UEs, which are determined based on the above, can be determined by further considering at least one of information on the relative positions, distances, or speeds of the primary candidate UEs. In more detail, FIG. 7 illustrates the above-described procedure for determining/selecting primary candidate UEs and final candidate UEs. Referring to FIG. 7, the server can collect a pair for collision calculation from a BSM/PSM (S701). The server can determine whether a host UE transmitting the message to the server and a remote UE paired with the host UE are in the same mode (S702).

If the host and remote UEs have the same mode, the server can select each of the host and remote UEs as the primary candidate UE (S708). If the host and remote UEs have different modes, the server can determine whether each of the host and remote UEs corresponds to a potential perpetrator or a potential victim (S703). The determination can be made as described above with reference to FIG. 6. For example, as described above, a vehicle can be a potential perpetrator for a PMV, a PMV can be a potential perpetrator for a pedestrian, and a pedestrian can be a potential victim for a vehicle and a PMV.

The server can determine whether the remote UE is a potential perpetrator (S704). If the remote UE is the potential perpetrator, the server can select the remote UE as the primary candidate UE (S708). If the remote UE is a potential victim, the server can determine the relative positions of the remote and host UEs (S705). The server can determine whether the remote UE is located in the traveling direction of the host UE (S706). When the remote UE is located in the traveling direction of the host UE, the remote UE can be selected as the primary candidate UE (S703). When the remote UE is not located in the traveling direction of the host UE, the remote UE is not selected as the primary candidate UE (S707).

Figure 8:
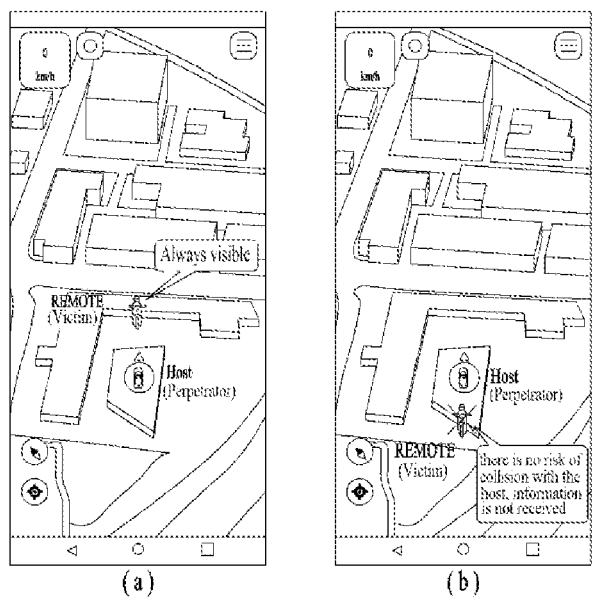
Figure 8:
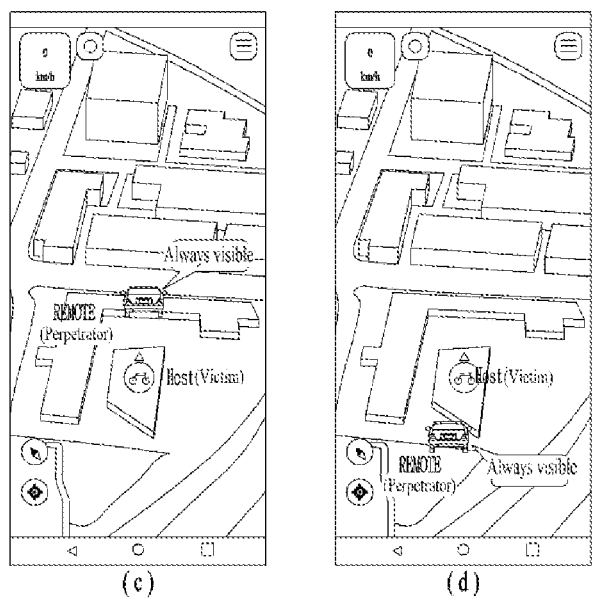

Next, FIG. 8 illustrates how the above-described method is applied to and implemented in soft V2X UEs. In particular, FIGS. 8(*a*) and 8(*b*) show a case where the host UE is a potential perpetrator, and FIGS. 8(*c*) and 8(*d*) show a case where the host UE is a potential victim.

If a UE receiving a risk candidate list is a potential perpetrator, the UE can display only a remote UE with a risk of collision on a Soft V2X application screen. As described above, when the host UE is a potential perpetrator, the remote UE, which is a potential victim, can be determined as the primary candidate UE only if there is risk of collision. Thus, if there is risk of collision, the UE can be included in the risk candidate list, which is received from the BS, and the UE can display the remote UE, which is the potential victim, as illustrated in FIG. 8(*a*). In other words, when the remote UE is the potential victim, and when the risk of collision exists, the host UE can receive information on the remote UE from the server and display the remote UE. When the remote UE is the potential victim but there is no risk of collision, the host UE does not receive information on the remote UE from the server and does not display the remote UE. In addition, when the remote UE is the potential victim but there is no risk of collision, the host UE can receive a notification from the server that the remote UE is not subject to processing and then mark the remote UE as inactive.

FIGS. 8(*c*) and 8(*d*) illustrate an example in which a host UE displays a remote UE according to the risk of collision when the host UE is a potential victim. If the remote UE is a potential perpetrator, the host UE can always receive and display information on the remote UE to protect itself. In other words, when a UE receiving the risk candidate list is a potential victim, the UE can display a remote UE, which is a potential perpetrator, on the Soft V2X application screen.

Figure 9:
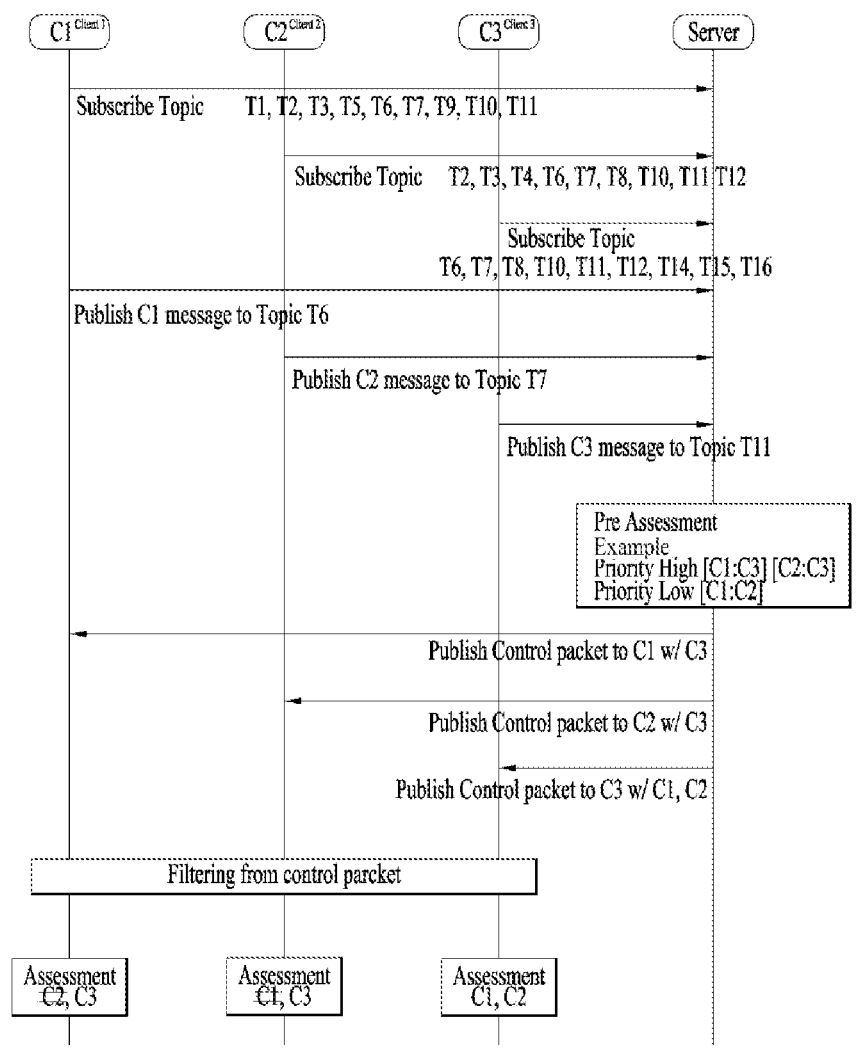
Figure 10:
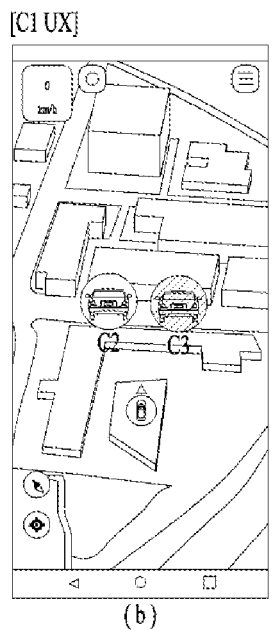
Figure 10:
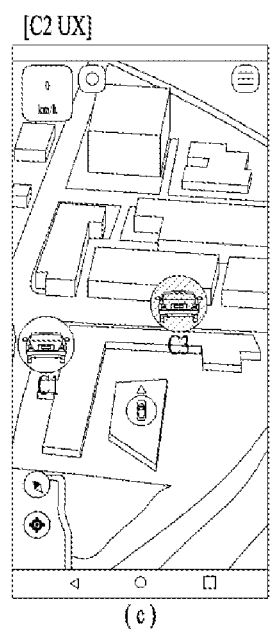
Figure 10:
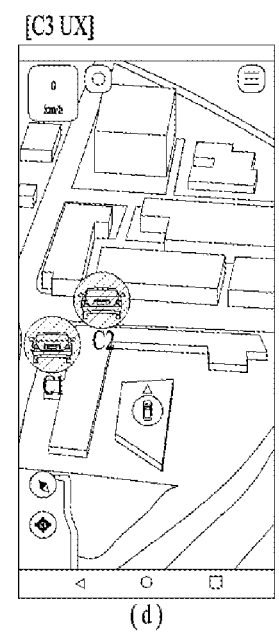

Next, FIG. 9 is a flowchart illustrating a server control method according to the above description. Referring to FIG. 9, each UE (C1, C2, and C3) can request subscription to 9 topics and transmit a message (BSM/PSM) to a server. It is assumed that the UEs are arranged as illustrated in FIG. 10(*a*). The server can pre-evaluate the messages received from C1, C2, and C3 to determine a risk candidate list. In this instance, the risk candidate list can be determined as described above.

The server can generate a control packet and transmit the risk candidate list to each UE. Referring to FIG. 9, C3 can be included in the risk candidate list for C1; C3 can be included in the risk candidate list for C2; and C1 and C2 can be included in the risk candidate list for C3. Each UE, i.e., each of C1, C2, and C3 can evaluate only UE(s) corresponding to the control packet in the received message. In addition, each of C1, C2, and C3 can display dangerous objects in a specific color on the screen thereof as shown in FIGS. 10(*b*), 10(*c*), and 10(*d*) (in the drawings, the objects are hatched).

Figure 11:
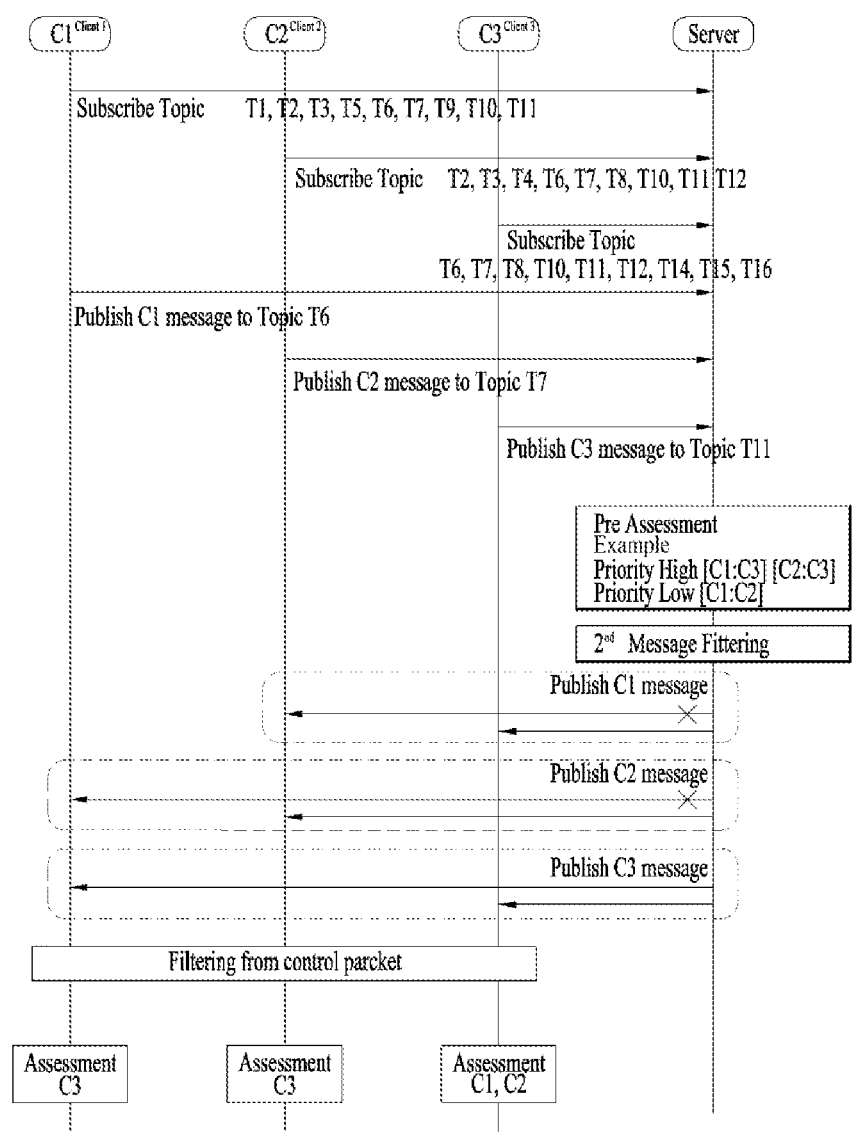
Figure 12:
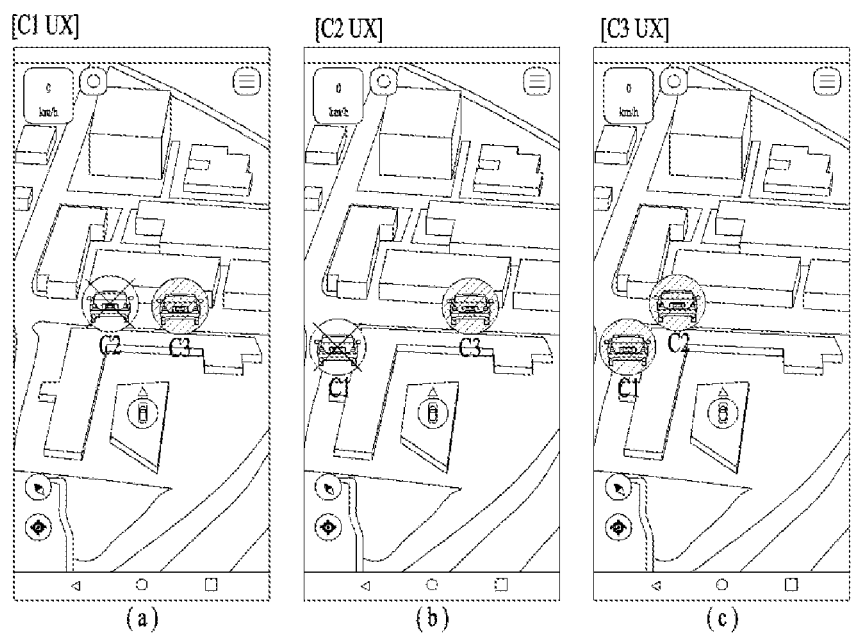

Next, FIG. 11 illustrates a method in which a server does not relay all messages between adjacent UEs, but relays only messages between UEs having high collision risk selected according to pre-assessment of risk performed by the server. Referring to FIG. 11, UEs (C1, C2, and C3) can request subscription to 9 topics and transmit a message (BSM/PSM) to the server. The server can pre-evaluate the messages received from C1, C2, and C3 to determine a risk candidate list. The server can provide information on UE(s) corresponding to the risk candidate list to each UE. As shown in FIGS. 12(a), 12(b), and 12(c), each of C1, C2, and C3 can display only UEs belonging to the risk candidate list (which means that UEs marked with X are not displayed)

Figure 14:
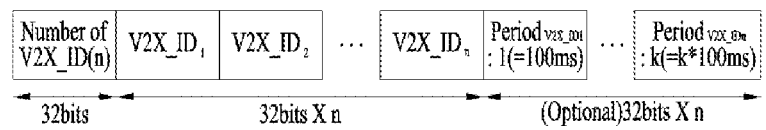

FIGS. 13 and 14 illustrate exemplary messages for transmission of the above-described risk candidate list to UEs. In particular, FIG. 13 illustrates a method based on MQTT Publish Control Packet. Specifically, a specific topic can be published with information on a risk candidate list, and a client can extract and use the risk candidate list information from a message. In this instance, the specific topic can be predefined between the server and UEs to exchange the risk candidate list.

FIG. 14 illustrates a method based on MQTT Reserved Control Packet. Specifically, as shown in FIG. 14(a), Reserved Control Packet Type (0) can be used (that is, the MQTT protocol can be extended to exchange information related to Soft V2X). UE information to be processed by a client can be added by assigning Risk Candidate List Command=2 to a specific command for Soft V2X in a variable header and adding risk candidate list information to the payload.

Figure 15:
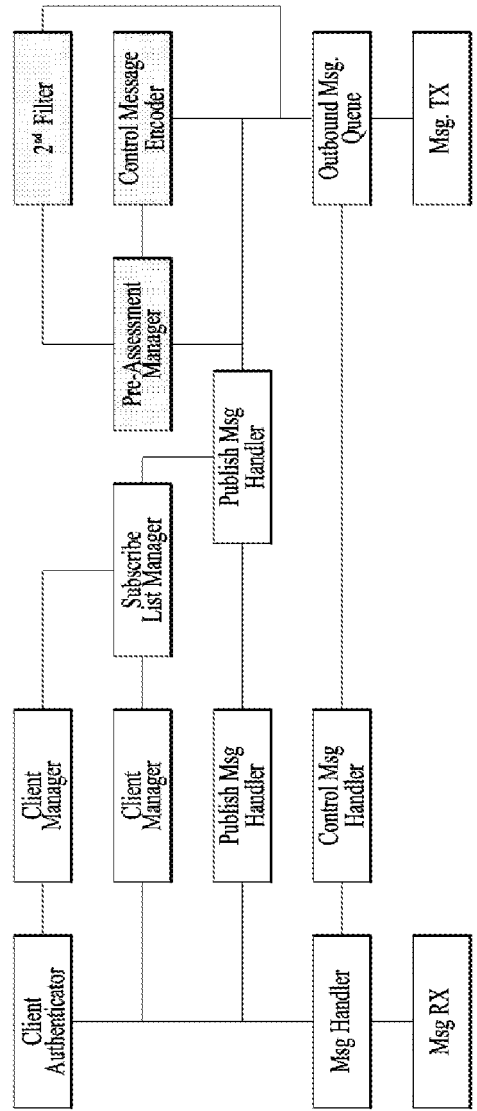
FIGS. 15 to 19 are diagrams illustrating various devices to which the embodiment(s) are applicable.

Next, FIG. 15 illustrates the structure of the above-described server. Referring to FIG. 15, a pre-assessment manager (Pre-Assessment Manager) can be a module configured to perform pre-assessment of risk for UE pairs in order to determine the risk of collision between UEs and determine a transmission/processing cycle (as needed). A control message encoder (Control Message Encoder) can create a control message to be transmitted to UEs. A second filter (2nd Filter) can filter UEs with high collision risk obtained from the pre-assessment manager and transfer the UEs to an outbound message queue (Outbound Msg Queue).

A message receiver (Msg RX) can be a module configured to receive messages from UEs. A message handler (Msg Handler) can classify the messages based on message types and transfer each message to a module capable of processing the corresponding message. A control message handler (Control Msg Handler) can process a control message. A publication message handler (Publish Msg Handler) can process a Publish message received from a client. The received Publish message can be forwarded to a message router and filter (Msg Router & Filter) to provide the message to a client that needs to receive the corresponding message.

Msg Router & Filter can check a Subscribe list to select a client to receive the Publish message. Msg Router & Filter can filter cases where the message does not need to be forwarded based on client types and provide the cases to Outbound Msg Queue. Outbound Msg Queue refers to a queue for temporarily storing messages whose destinations are determined. A message transmitter (Msg TX) can be a module configured to transmit messages. A subscription message handler (Subscribe Msg Handler) can be a module configured to process a Subscribe message. The Subscribe list can be created according to a client's request. A subscription list manager (Subscribe List Manger) is a module configured to manage the Subscribe list. The Subscribe list can be used to find a client to receive the Publish message. A client authenticator (Client Authenticator) can be a module responsible for client authentication. Only authorized clients can use Soft V2X services. A client manager (Client Manager) can be a module configured to manage the authenticated clients.

An operation method for the above-described server can include receiving messages from a plurality of UEs; determining a risk candidate list based on the messages received from the plurality of UEs; and transmitting the risk candidate list. Final candidate UEs included in the risk candidate list can be determined by pre-assessment of risk between pairs of UEs including the plurality of UEs.

In addition, a UE related to soft V2X can include a transmitter configured to transmit a message to a server; and a receiver configured to receive a risk candidate list from the server. The risk candidate list can be determined by the server based on messages received from a plurality of UEs including the UE. Final candidate UEs included in the risk candidate list can be determined by pre-assessment of risk between pairs of UEs including the plurality of UEs.

Further, an operation method for a UE related to soft V2X can include transmitting a message to a server; and receiving a risk candidate list from the server. The risk candidate list can be determined by the server based on messages received from a plurality of UEs including the UE. Final candidate UEs included in the risk candidate list can be determined by pre-assessment of risk between pairs of UEs including the plurality of UEs.

Examples of Communication Systems Applicable to the Present Disclosure

The various descriptions, functions, procedures, proposals, methods, and/or operational flowcharts of the present disclosure described in this document can be applied to, without being limited to, a variety of fields requiring wireless communication/connection (e.g., 5G) between devices.

Hereinafter, a description will be given in more detail with reference to the drawings. In the following drawings/description, the same reference symbols can denote the same or corresponding hardware blocks, software blocks, or functional blocks unless described otherwise.

Figure 16:
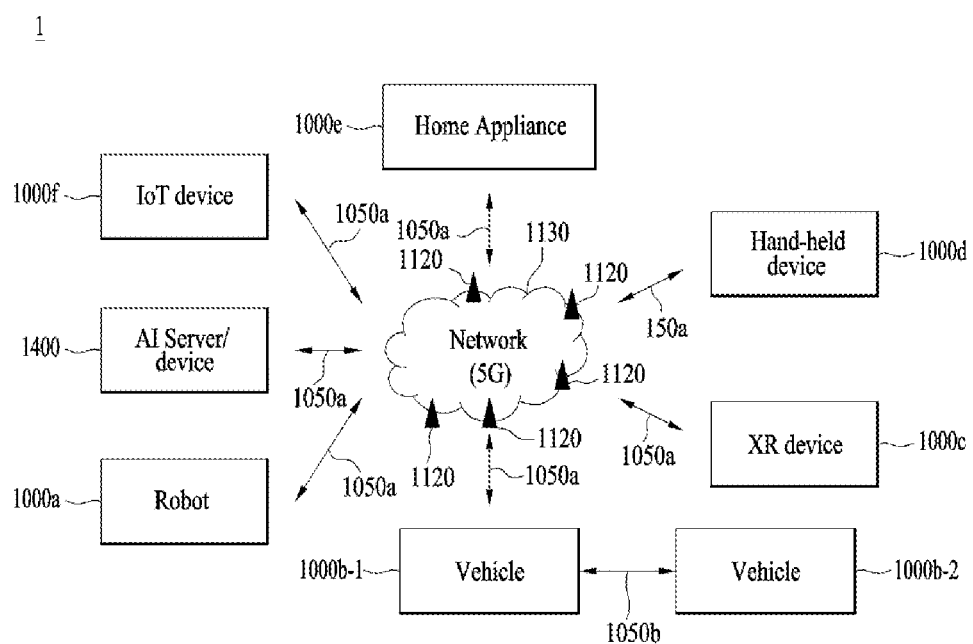

FIG. 16 illustrates a communication system 1 applied to the present disclosure. Referring to FIG. 16, a communication system 1 applied to the present disclosure includes wireless devices, BSs, and a network. Herein, the wireless devices represent devices performing communication using RAT (e.g., 5G NR or LTE) and can be referred to as communication/radio/5G devices. The wireless devices can include, without being limited to, a robot 1000a, vehicles 1000b-1 and 1000b-2, an extended reality (XR) device 1000c, a hand-held device 1000d, a home appliance 1000e, an Internet of things (IoT) device 1000f, and an artificial intelligence (AI) device/server 1400. For example, the vehicles can include a vehicle having a wireless communication function, an autonomous driving vehicle, and a vehicle capable of performing communication between vehicles. Herein, the vehicles can include an unmanned aerial vehicle (UAV) (e.g., a drone). The XR device can include an augmented reality (AR)/virtual reality (VR)/mixed reality (MR) device and can be implemented in the form of a head-mounted device (HMD), a head-up display (HUD) mounted in a vehicle, a television, a smartphone, a computer, a wearable device, a home appliance device, a digital signage, a vehicle, a robot, etc.

The hand-held device can include a smartphone, a smartpad, a wearable device (e.g., a smartwatch or a smartglasses), and a computer (e.g., a notebook). The home appliance can include a TV, a refrigerator, and a washing machine. The IoT device can include a sensor and a smartmeter. For example, the BSs and the network can be implemented as wireless devices and a specific wireless device can operate as a BS/network node with respect to other wireless devices.

The wireless devices 1000*a* to 1000*f* can be connected to the network 1130 via the BSs 1120. An AI technology can be applied to the wireless devices 1000*a* to 1000*f* and the wireless devices 1000*a* to 1000*f* can be connected to the AI server 1400 via the network 1130. The network 1130 can be configured using a 3G network, a 4G (e.g., LTE) network, or a 5G (e.g., NR) network. Although the wireless devices 1000*a* to 1000*f* can communicate with each other through the BSs 1120/network 1130, the wireless devices 1000*a* to 1000*f* can perform direct communication (e.g., sidelink communication) with each other without passing through the BSs/network. For example, the vehicles 1000*b*-1 and 1000*b*-2 can perform direct communication (e.g., V2V/V2X communication). The IoT device (e.g., a sensor) can perform direct communication with other IoT devices (e.g., sensors) or other wireless devices 1000*a* to 1000*f.*

Wireless communication/connections 1050*a*, 1050*b*, or 1050*c* can be established between the wireless devices 1000*a* to 1000*f*/BS 1120, or BS 1120/BS 1120. Herein, the wireless communication/connections can be established through various RATs (e.g., 5G NR) such as UL/DL communication 1050*a*, sidelink communication 1050*b* (or D2D communication), or inter BS communication (e.g., relay, integrated access backhaul (IAB)). The wireless devices and the BSs/the wireless devices can transmit/receive radio signals to/from each other through the wireless communication/connections 1050*a* and 1050*b*. For example, the wireless communication/connections 1050*a* and 1050*b* can transmit/receive signals through various physical channels. Thus, at least a part of various configuration information configuring processes, various signal processing processes (e.g., channel encoding/decoding, modulation/demodulation, and resource mapping/demapping), and resource allocating processes, for transmitting/receiving radio signals, can be performed based on the various proposals of the present disclosure.

Figure 17:
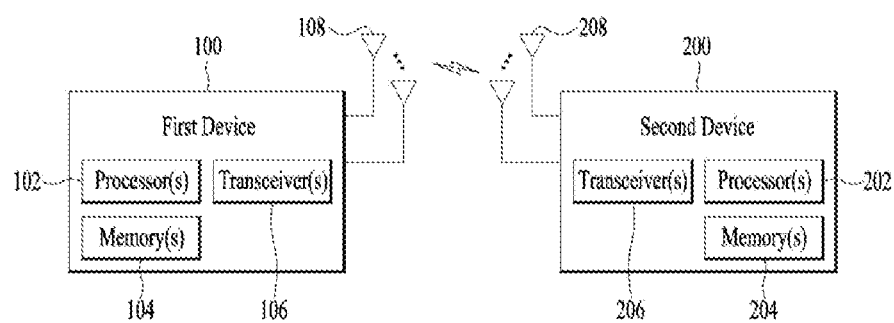

Examples of wireless devices applicable to the present disclosure. FIG. 17 illustrates wireless devices applicable to the present disclosure. Referring to FIG. 17, a first wireless device 100 and a second wireless device 200 can transmit radio signals through a variety of RATs (e.g., LTE and NR). Herein, {the first wireless device 100 and the second wireless device 200} can correspond to {the wireless device 100*x* and the BS 200} and/or {the wireless device 100*x* and the wireless device 100*x*} of FIG. 16.

The first wireless device 100 can include one or more processors 102 and one or more memories 104 and additionally further include one or more transceivers 106 and/or one or more antennas 108. The processor(s) 102 can control the memory(s) 104 and/or the transceiver(s) 106 and can be configured to implement the descriptions, functions, procedures, proposals, methods, and/or operational flowcharts disclosed in this document. For example, the processor(s) 102 can process information within the memory(s) 104 to generate first information/signals and then transmit radio signals including the first information/signals through the transceiver(s) 106.

The processor(s) 102 can receive radio signals including second information/signals through the transceiver 106 and then store information obtained by processing the second information/signals in the memory(s) 104. The memory(s) 104 can be connected to the processor(s) 102 and can store a variety of information related to operations of the processor(s) 102. For example, the memory(s) 104 can store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 can be a part of a communication modem/circuit/chip designed to implement RAT (e.g., LTE or NR). The transceiver(s) 106 can be connected to the processor(s) 102 and transmit and/or receive radio signals through one or more antennas 108. Each of the transceiver(s) 106 can include a transmitter and/or a receiver. The transceiver(s) 106 can be interchangeably used with Radio Frequency (RF) unit(s). In the present disclosure, the wireless device can represent a communication modem/circuit/chip.

The second wireless device 200 can include one or more processors 202 and one or more memories 204 and additionally further include one or more transceivers 206 and/or one or more antennas 208. The processor(s) 202 can control the memory(s) 204 and/or the transceiver(s) 206 and can be configured to implement the descriptions, functions, procedures, proposals, methods, and/or operational flowcharts disclosed in this document. For example, the processor(s) 202 can process information within the memory(s) 204 to generate third information/signals and then transmit radio signals including the third information/signals through the transceiver(s) 206.

The processor(s) 202 can receive radio signals including fourth information/signals through the transceiver(s) 206 and then store information obtained by processing the fourth information/signals in the memory(s) 204. The memory(s) 204 can be connected to the processor(s) 202 and can store a variety of information related to operations of the processor(s) 202. For example, the memory(s) 204 can store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 can be a part of a communication modem/circuit/chip designed to implement RAT (e.g., LTE or NR). The transceiver(s) 206 can be connected to the processor(s) 202 and transmit and/or receive radio signals through one or more antennas 208. Each of the transceiver(s) 206 can include a transmitter and/or a receiver. The transceiver(s) 206 can be interchangeably used with RF unit(s). In the present disclosure, the wireless device can represent a communication modem/circuit/chip.

Hereinafter, hardware elements of the wireless devices 100 and 200 will be described more specifically. One or more protocol layers can be implemented by, without being limited to, one or more processors 102 and 202. For example, the one or more processors 102 and 202 can implement one or more layers (e.g., functional layers such as PHY, MAC, RLC, PDCP, RRC, and SDAP). The one or more processors 102 and 202 can generate one or more Protocol Data Units (PDUs) and/or one or more service data unit (SDUs) according to the descriptions, functions, procedures, proposals, methods, and/or operational flowcharts disclosed in this document.

The one or more processors 102 and 202 can generate messages, control information, data, or information according to the descriptions, functions, procedures, proposals, methods, and/or operational flowcharts disclosed in this document. The one or more processors 102 and 202 can generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 can receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 can be referred to as controllers, microcontrollers, microprocessors, or microcomputers. The one or more processors 102 and 202 can be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) can be included in the one or more processors 102 and 202. The descriptions, functions, procedures, proposals, methods, and/or operational flowcharts disclosed in this document can be implemented using firmware or software and the firmware or software can be configured to include the modules, procedures, or functions. Firmware or software configured to perform the descriptions, functions, procedures, proposals, methods, and/or operational flowcharts disclosed in this document can be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document can be implemented using firmware or software in the form of code, commands, and/or a set of commands.

The one or more memories 104 and 204 can be connected to the one or more processors 102 and 202 and store various types of data, signals, messages, information, programs, code, instructions, and/or commands. The one or more memories 104 and 204 can be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 can be located at the interior and/or exterior of the one or more processors 102 and 202. The one or more memories 104 and 204 can be connected to the one or more processors 102 and 202 through various technologies such as wired or wireless connection.

The one or more transceivers 106 and 206 can transmit user data, control information, and/or radio signals/channels, mentioned in the methods and/or operational flowcharts of this document, to one or more other devices. The one or more transceivers 106 and 206 can receive user data, control information, and/or radio signals/channels, mentioned in the descriptions, functions, procedures, proposals, methods, and/or operational flowcharts disclosed in this document, from one or more other devices. For example, the one or more transceivers 106 and 206 can be connected to the one or more processors 102 and 202 and transmit and receive radio signals. For example, the one or more processors 102 and 202 can perform control so that the one or more transceivers 106 and 206 can transmit user data, control information, or radio signals to one or more other devices. The one or more processors 102 and 202 can perform control so that the one or more transceivers 106 and 206 can receive user data, control information, or radio signals from one or more other devices. The one or more transceivers 106 and 206 can be connected to the one or more antennas 108 and 208 and the one or more transceivers 106 and 206 can be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas can be a plurality of physical antennas or a plurality of logical antennas (e.g., antenna ports).

The one or more transceivers 106 and 206 can convert received radio signals/channels etc. from RF band signals into baseband signals in order to process received user data, control information, radio signals/channels, etc. using the one or more processors 102 and 202. The one or more transceivers 106 and 206 can convert the user data, control information, radio signals/channels, etc. processed using the one or more processors 102 and 202 from the base band signals into the RF band signals. To this end, the one or more transceivers 106 and 206 can include (analog) oscillators and/or filters.

Figure 18:
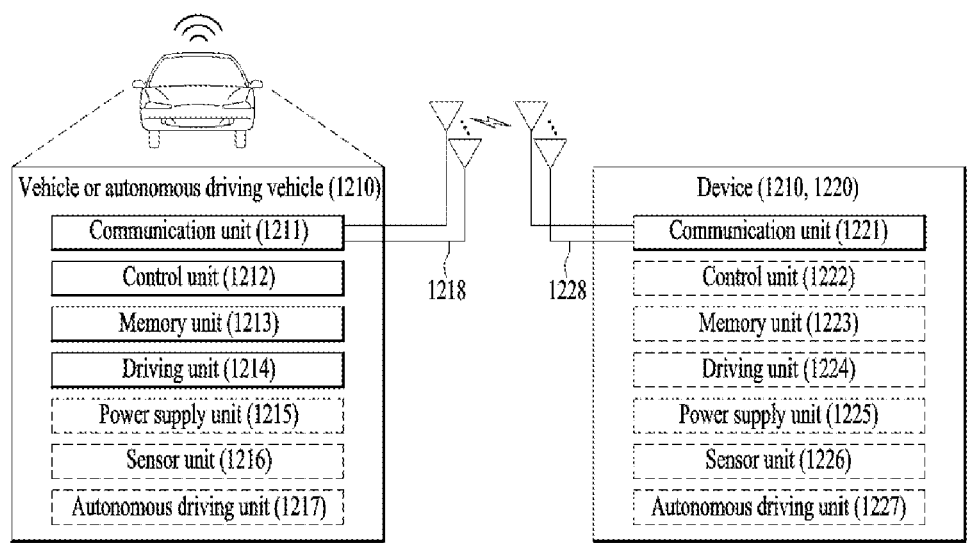

Examples of a vehicle or an autonomous driving vehicle applicable to the present disclosure. In particular, FIG. 18 illustrates a vehicle or an autonomous driving vehicle applied to the present disclosure. The vehicle or autonomous driving vehicle can be implemented by a mobile robot, a car, a train, a manned/unmanned aerial vehicle (AV), a ship, etc.

Referring to FIG. 18, a vehicle or autonomous driving vehicle 1210 can include an antenna unit 1218, a communication unit 1211, a control unit 1212, a memory unit 1213, a driving unit 1214, a power supply unit 1215, a sensor unit 1216, and an autonomous driving unit 1217. The antenna unit 1218 can be configured as a part of the communication unit 1211.

The communication unit 1211 can transmit and receive signals (e.g., data and control signals) to and from external devices such as other vehicles, BSs (e.g., gNBs and road side units), and servers. The control unit 1212 can perform various operations by controlling elements of the vehicle or the autonomous driving vehicle 1210. The control unit 1212 can include an ECU. The driving unit 1214 can cause the vehicle or the autonomous driving vehicle 1210 to drive on a road.

The driving unit 1214 can include an engine, a motor, a powertrain, a wheel, a brake, a steering device, etc. The power supply unit 1215 can supply power to the vehicle or the autonomous driving vehicle 1210 and include a wired/wireless charging circuit, a battery, etc. The sensor unit 1216 can acquire a vehicle state, ambient environment information, user information, etc. The sensor unit 1216 can include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 1217 can implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 1211 can receive map data, traffic information data, etc. from an external server. The autonomous driving unit 1217 can generate an autonomous driving path and a driving plan from the obtained data. The control unit 1212 can control the driving unit 1214 such that the vehicle or the autonomous driving vehicle 1210 can move along the autonomous driving path according to the driving plan (e.g., speed/direction control).

In the middle of autonomous driving, the communication unit 1211 can aperiodically/periodically acquire recent traffic information data from the external server and acquire surrounding traffic information data from neighboring vehicles. In the middle of autonomous driving, the sensor unit 1216 can obtain a vehicle state and/or surrounding environment information. The autonomous driving unit 1214 can update the autonomous driving path and the driving plan based on the newly obtained data/information. The communication unit 1211 can transfer information about a vehicle position, the autonomous driving path, and/or the driving plan to the external server. The external server can predict traffic information data using AI technology, etc., based on the information collected from vehicles or autonomous driving vehicles and provide the predicted traffic information data to the vehicles or the autonomous driving vehicles.

For example, FIG. 18 illustrate a neighboring vehicle 1210 or device 1220. As shown, the neighboring vehicle 1210 or device 1220 also includes an antenna unit 1228, a communication unit 1221, a control unit 1222, a memory unit 1223, a driving unit 1224, a power supply unit 1225, a sensor unit 1226, and an autonomous driving unit 1227. The antenna unit 1228 can be configured as a part of the communication unit 1221.

Figure 19:
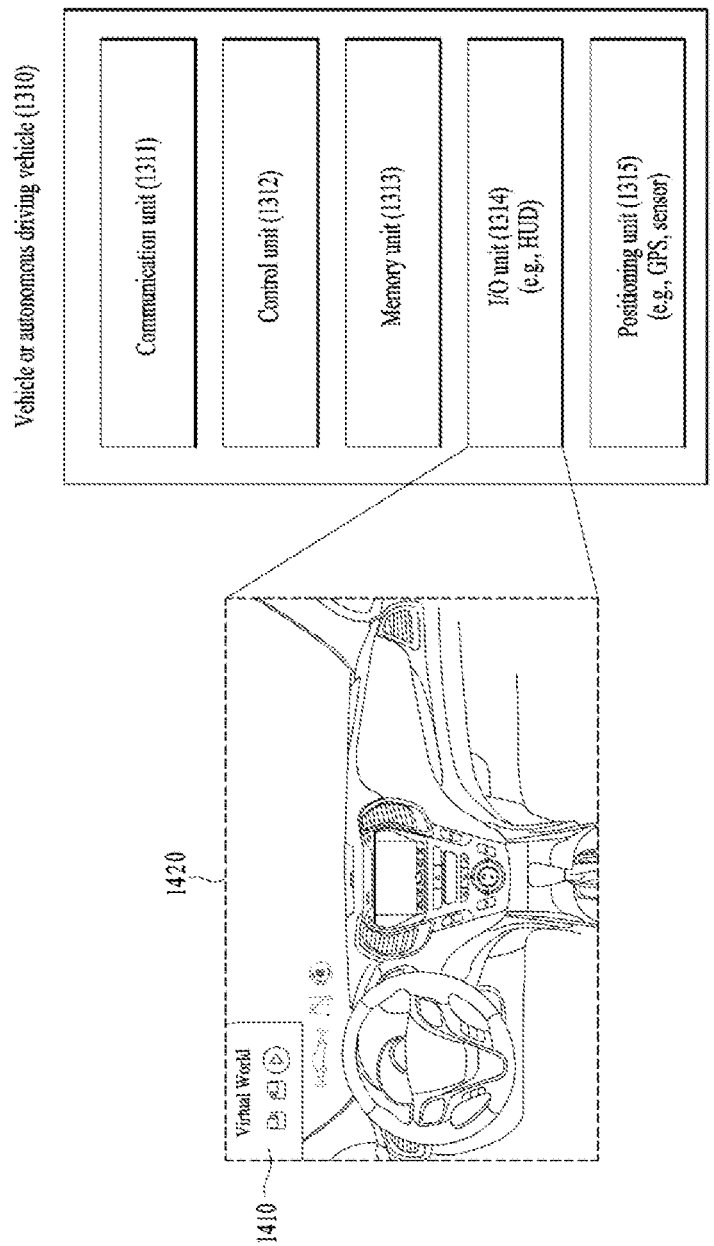

Examples of a vehicle and AR/VR applicable to the present disclosure. In particular, FIG. 19 illustrates a vehicle applied to the present disclosure. The vehicle can be implemented as a transport means, an aerial vehicle, a ship, etc. Referring to FIG. 19, a vehicle 1310 can include a communication unit 1311, a control unit 1312, a memory unit 1313, an I/O unit 1314, and a positioning unit 1315.

The communication unit 1311 can transmit and receive signals (e.g., data and control signals) to and from external devices such as other vehicles or BSs. The control unit 1312 can perform various operations by controlling constituent elements of the vehicle 1310. The memory unit 1313 can store data/parameters/programs/code/commands for supporting various functions of the vehicle 1310.

The I/O unit 1314 can output an AR/VR object based on information within the memory unit 1313. The I/O unit 1314 can include an HUD. The positioning unit 1315 can acquire information about the position of the vehicle 1310. The position information can include information about an absolute position of the vehicle 1310, information about the position of the vehicle 1310 within a traveling lane, acceleration information, and information about the position of the vehicle 1310 from a neighboring vehicle. The positioning unit 1315 can include a GPS and various sensors.

As an example, the communication unit 1311 of the vehicle 1310 can receive map information and traffic information from an external server and store the received information in the memory unit 1313. The positioning unit 1315 can obtain the vehicle position information through the GPS and various sensors and store the obtained information in the memory unit 1313. The control unit 1312 can generate a virtual object based on the map information, traffic information, and vehicle position information and the I/O unit 1314 can display the generated virtual object 1410 in a window 1420 in the vehicle. The control unit 1312 can determine whether the vehicle 1310 normally drives within a traveling lane, based on the vehicle position information. If the vehicle 1310 abnormally exits from the traveling lane, the control unit 1312 can display a warning on the window in the vehicle through the I/O unit 1314. In addition, the control unit 1312 can broadcast a warning message regarding driving abnormity to neighboring vehicles through the communication unit 1311. According to situation, the control unit 1312 can transmit the vehicle position information and the information about driving/vehicle abnormality to related organizations.

As is apparent from the above description, the present disclosure has effects as follows.

According to embodiment(s), effects such as reduction in network complexity and data cost, reduction in latency of messages for risk assessment, and improvement in efficiency of processing resources of a UE can be expected.

It will be apparent to those skilled in the art that various modifications and variations can be made in the present disclosure without departing from the spirit and scope of the disclosure. Thus, it is intended that the present disclosure cover the modifications and variations of this disclosure provided they come within the scope of the appended claims and their equivalents.

What is claimed is:

1. A Soft Vehicle to Everything (V2X) server in a wireless communication system, the Soft V2X server comprising:
  a receiver configured to receive messages from a plurality of user equipment (UEs);
  a controller configured to:
    determine an assessment risk between a pair of UEs included in the plurality of UEs based on the received messages, and
    determine at least one primary candidate UE among the pair of UEs to be included in a risk candidate list based on the determined assessment risk between the pair of UEs; and
  a transmitter configured to transmit the risk candidate list to the plurality of UEs,
  wherein the pair of UEs includes a host UE that transmits a message to the Soft V2X server and a remote UE paired with the host UE,
  wherein the assessment risk is determined based on at least one of: whether the host UE and the remote UE have a same operation mode, directional headings of the host UE and the remote UE, or relative positions of the host UE and the remote UE, and
  wherein based on that the host UE and the remote UE have the same operation mode, the controller determines the host UE and the remote UE as the primary candidate UE.

2. The server of claim 1, wherein the controller is further configured to determine whether the at least one primary candidate is a final candidate to be included in the risk candidate list by further considering at least one of information on relative positions, distances, or speeds of the primary candidate UE.

3. The server of claim 1, wherein the operation mode includes a pedestrian, a vehicle, or a personal mobility vehicle (PMV), and
  wherein the controller assigns the vehicle as a potential perpetrator for the PMV, the PMV as a potential perpetrator for the pedestrian, and the pedestrian as a potential victim for both the vehicle and the PMV.

4. The server of claim 3, wherein based on that the host UE and the remote UE have different operation modes and that the remote UE is assigned as the potential perpetrator, the controller determines the remote UE as the primary candidate UE.

5. The server of claim 3, wherein based on that the host UE and the remote UE have different operation modes, the host UE is assigned as the potential perpetrator and the remote UE is assigned as the potential victim, the controller determines the remote UE as the primary candidate UE only when determining there is risk of collision between the host UE and the remote UE.

6. The server of claim 5, wherein controller determines there is the risk of collision:
   when the remote UE assigned as the potential victim is in front of the host UE assigned as the potential perpetrator and the remote UE assigned as the potential victim and the host UE assigned as the potential perpetrator are traveling in a same direction; and
   when the remote UE assigned as the potential victim is behind the host UE assigned as the potential perpetrator and the remote UE assigned as the potential victim and the host UE assigned as the potential perpetrator are traveling in a direction approaching each other.

7. A Soft Vehicle to Everything (V2X) user equipment (UE) in a wireless communication system, the UE comprising:
   a transmitter configured to transmit a message to a Soft V2X server; and
   a receiver configured to receive a risk candidate list from the Soft V2X server, the risk candidate list indicating at least one primary candidate UE among a pair of UEs including the UE and at least one other UE, the at least one primary candidate UE being selected based on a determined assessment risk between the pair of UEs,
   wherein the pair of UEs includes a host UE that transmits a message to the Soft V2X server and a remote UE paired with the host UE,
   wherein the assessment risk is determined based on at least one of: whether the host UE and the remote UE have a same operation mode, directional headings of the host UE and the remote UE, or relative positions of the host UE and the remote UE, and
   wherein based on that the host UE and the remote UE have the same operation mode, the host UE and the remote UE are determined as the primary candidate UE.

8. The Soft V2X UE of claim 7, wherein the at least one primary candidate in the risk candidate list is a final candidate selected by further considering at least one of information on relative positions, distances, or speeds of the primary candidate UE.

9. The Soft V2X UE of claim 7, wherein the pair of UEs includes the Soft V2X UE as a host UE that transmits a message to the Soft V2X server and a remote UE paired with the host UE, and
   wherein the assessment risk is determined based on at least one of:
   whether the host UE and the remote UE have a same operation mode,
   directional headings of the host UE and the remote UE, or
   relative positions of the host UE and the remote UE.

10. The Soft V2X UE of claim 9, wherein the operation mode includes a pedestrian, a vehicle, or a personal mobility vehicle (PMV), and
    wherein the vehicle is assigned as a potential perpetrator for the PMV, the PMV is assigned as a potential perpetrator for the pedestrian, and the pedestrian is assigned as a potential victim for both the vehicle and the PMV.

11. The Soft V2X UE of claim 10,
    wherein based on that the host UE and the remote UE have different operation modes and that the remote UE is assigned as the potential perpetrator, the remote UE is included as the primary candidate UE, and
    wherein based on that the host UE and the remote UE have different operation modes, the host UE is assigned as the potential perpetrator and the remote UE is assigned as the potential victim, the remote UE is included as the primary candidate UE only when there is risk of collision between the host UE and the remote UE.

12. The Soft V2X UE of claim 11, wherein there is the risk of collision:
    when the remote UE assigned as the potential victim is in front of the host UE assigned as the potential perpetrator and the remote UE assigned as the potential victim and the host UE assigned as the potential perpetrator are traveling in a same direction; and
    when the remote UE assigned as the potential victim is behind the host UE assigned as the potential perpetrator and the remote UE assigned as the potential victim and the host UE assigned as the potential perpetrator are traveling in a direction approaching each other.

13. A Soft Vehicle to Everything (V2X) server control method comprising:
    receiving, via a receiver included in the Soft V2X server, messages from a plurality of user equipment (UEs);
    determining, via a controller included in the Soft V2X server, an assessment risk between a pair of UEs included in the plurality of UEs based on the received messages;
    determining, via the controller, at least one primary candidate UE among the pair of UEs to be included in a risk candidate list based on the determined assessment risk between the pair of UEs; and
    transmitting, via a transmitter, the risk candidate list to the plurality of UEs,
    wherein the pair of UEs includes a host UE that transmits a message to the Soft V2X server and a remote UE paired with the host UE,
    wherein the assessment risk is determined based on at least one of: whether the host UE and the remote UE have a same operation mode, directional headings of the host UE and the remote UE, or relative positions of the host UE and the remote UE, and
    wherein based on that the host UE and the remote UE have the same operation mode, the controller determines the host UE and the remote UE as the primary candidate UE.

14. The method of claim 13, further comprising:
    determining whether the at least one primary candidate is a final candidate to be included in the risk candidate list by further considering at least one of information on relative positions, distances, or speeds of the primary candidate UE.

15. The method of claim 13, wherein the operation mode includes a pedestrian, a vehicle, or a personal mobility vehicle (PMV), and
    wherein the method further comprises assigning the vehicle as a potential perpetrator for the PMV, the PMV as a potential perpetrator for the pedestrian, and the pedestrian as a potential victim for both the vehicle and the PMV.

16. The method of claim 15, wherein based on that the host UE and the remote UE have different operation modes and that the remote UE is assigned as the potential perpetrator, the method further comprises determining the remote UE as the primary candidate UE.

* * * * *